(12) United States Patent
Wilson et al.

(10) Patent No.: US 9,786,188 B2
(45) Date of Patent: Oct. 10, 2017

(54) SAFETY MOTOR CONTROLLER FOR A VEHICLE

(71) Applicant: QUALCOMM Incorporated, San Diego, CA (US)

(72) Inventors: James Wilson, Trabuco Canyon, CA (US); Kaustubh Gondkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 14/858,632

(22) Filed: Sep. 18, 2015

(65) Prior Publication Data

US 2017/0084181 A1    Mar. 23, 2017

(51) Int. Cl.
*G06F 7/00* (2006.01)
*G08G 5/00* (2006.01)

(52) U.S. Cl.
CPC ........... *G08G 5/0069* (2013.01); *G08G 5/006* (2013.01); *G08G 5/0013* (2013.01); *G08G 5/0039* (2013.01); *G08G 5/0056* (2013.01); *B64C 2201/027* (2013.01); *B64C 2201/042* (2013.01); *B64C 2201/141* (2013.01); *B64C 2201/146* (2013.01)

(58) Field of Classification Search
CPC .... G08G 5/0069; G08G 5/006; B64C 39/024; B64C 2201/024; B64C 2201/042
See application file for complete search history.

(56) References Cited

U.S. PATENT DOCUMENTS

| | | | |
|---|---|---|---|
| 8,751,061 B2* | 6/2014 | Coulmeau | G08G 5/0013 701/2 |
| 8,886,459 B2* | 11/2014 | Stefani | G01C 21/00 701/120 |
| 8,983,682 B1 | 3/2015 | Peeters et al. | |
| 2005/0187677 A1 | 8/2005 | Walker | |
| 2011/0118980 A1 | 5/2011 | Hoy | |
| 2011/0301784 A1* | 12/2011 | Oakley | B64C 27/04 701/2 |
| 2012/0083945 A1* | 4/2012 | Oakley | B64C 27/08 701/2 |
| 2015/0232181 A1* | 8/2015 | Oakley | B64C 39/024 701/2 |

* cited by examiner

*Primary Examiner* — Ian Jen
(74) *Attorney, Agent, or Firm* — Foley & Lardner LLP (57) ABSTRACT

According to various embodiments, there is provided a safety motor controller (SMC) for installing in an unmanned aerial vehicle (UAV) between at least one electronic speed controller (ESC) configured to use a predetermined data protocol and an existing motor controller (EMC) configured to transmit EMC motor control signals in accordance with the predetermined data protocol to the at least one ESC, the SMC including: an input port configured to receive the EMC motor control signals in accordance with the predetermined data protocol from the EMC; and a processor configured to detect a trigger event and to transmit SMC motor control signals corresponding to at least one of the EMC motor control signals in accordance with the predetermined data protocol to the at least one ESC in response to the trigger event.

26 Claims, 7 Drawing Sheets

SAFETY MOTOR CONTROLLER FOR A VEHICLE

BACKGROUND

The flight of aerial vehicles, and in particular, unmanned aerial vehicles (UAVs), is regulated by designated organizations, such as the Federal Aviation Administration (FAA). In the U.S. and other countries, other designated governmental or industry organizations may have a similar role. For example, the FAA (or other regulatory organization) may mandate that certain (or all) UAVs stay within visual line of sight of their users. On the other hand, the FAA (or other regulatory organization) may allow more freedom with respect to some UAV flight, by allowing beyond line of sight (BLOS) flight. However, these BLOS flight regulations may come with certain safety requirements for UAVs (e.g., in order for the UAVs to receive appropriate certification from the FAA or other regulatory organization). For example, in connection with BLOS flight, the FAA (or other regulatory organization) may mandate that UAVs be configured with certain capabilities, such as always-on telemetry, mechanical or software fault tolerance, geo-fencing, altitude restrictions, flight plan submission, approval requirements prior to take-off, and/or further capabilities or requirements. However, adherence to these flight requirements may be cumbersome and expensive for individual manufacturers to implement.

SUMMARY

In general, various embodiments relate to systems and methods that employ a safety motor controller configured to be easily installed in an unmanned or manned vehicle (such as, but not limited to, an unmanned aerial vehicle (UAV)). In various embodiments, the safety motor controller may be installed at a location between an existing motor controller of a UAV and motors of the UAV.

According to various embodiments, there is provided a safety motor controller (SMC) for installing in an unmanned aerial vehicle (UAV) between at least one electronic speed controller (ESC) configured to use a predetermined data protocol and an existing motor controller (EMC) configured to transmit EMC motor control signals in accordance with the predetermined data protocol to the at least one ESC, the SMC including: an input port configured to receive the EMC motor control signals in accordance with the predetermined data protocol from the EMC; and a processor configured to detect a trigger event and to transmit SMC motor control signals corresponding to at least one of the EMC motor control signals in accordance with the predetermined data protocol to the at least one ESC in response to the trigger event.

In some embodiments, the trigger event includes one or more of a geo-fence violation by the UAV, abnormal flight conditions of the UAV, and/or receipt of an emergency alert by the UAV.

In some embodiments, the SMC motor control signals are configured to control the at least one ESC to cause the UAV to perform an evasive action in response to the trigger event.

In some embodiments, the evasive action includes one or more of returning to a launch site, landing immediately, ceasing operation of at least one motor coupled to the at least one ESC, or combinations thereof.

In some embodiments, the safety motor controller further includes a wireless communication device configured to: constantly transmit telemetry data to a central entity; and receive a command and/or an alert from the central entity.

In some embodiments, the wireless communication device is further configured to receive flight authorization from the central entity; and the SMC is configured to prevent flight of the UAV until the flight authorization is received.

In some embodiments, the SMC is configured to change a flight plan of the UAV in response to receiving the command from the central entity.

In some embodiments, the telemetry data includes information about the UAV regarding location, flight path, velocity, and/or altitude.

In some embodiments, the safety motor controller further includes a plurality of sensors coupled to the processor and configured to detect the trigger event, the sensors including one or more of an inertial measurement unit (IMU), a global positioning system (GPS), a barometric pressure sensor, a temperature sensor, an altitude sensor, an airspeed sensor, or combinations thereof.

In some embodiments, the processor is configured to block the received EMC motor control signals from reaching the at least one ESC in response to the trigger event.

In some embodiments, the predetermined data protocol is one of a) universal asynchronous receiver/transmitter (UART), b) three-wire pulse-width modulation (PWM), or c) Inter-Integrated Circuit (I2C).

According to various embodiments, there is provided a method for controlling an unmanned aerial vehicle (UAV) including a safety motor controller (SMC) coupled between at least one electronic speed controller (ESC) configured to use a predetermined data protocol and an existing motor controller (EMC) configured to transmit EMC motor control signals in accordance with the predetermined data protocol to the at least one ESC, the method including: receiving the EMC motor control signals from the EMC; detecting a trigger event; and transmitting SMC motor control signals corresponding to at least one of the EMC motor control signals in accordance with the predetermined data protocol to the at least one ESC in response to the trigger event.

In some embodiments, the trigger event includes one or more of a geo-fence violation by the UAV, abnormal flight conditions of the UAV, and/or receipt of an emergency alert by the UAV.

In some embodiments, the SMC motor control signals are configured to control the at least one ESC to cause the UAV to perform an evasive action in response to the trigger event.

In some embodiments, the evasive action includes one or more of returning to a launch site, landing immediately, ceasing operation of at least one motor coupled to the at least one ESC, or a combination thereof.

In some embodiments, the method further includes: constantly transmitting telemetry data to a central entity; and receiving a command and/or an alert from the central entity.

In some embodiments, the method further includes: receiving flight authorization from the central entity; and preventing flight of the UAV until the flight authorization is received.

In some embodiments, the method further includes changing a flight plan of the UAV in response to receiving the command from the central entity.

In some embodiments, the telemetry data includes information about the UAV regarding location, flight path, velocity, and/or altitude.

In some embodiments, the method further includes detecting the trigger event using a plurality of sensors, the sensors including one or more of an inertial measurement unit (IMU), a global positioning system (GPS), a barometric pressure sensor, a temperature sensor, an altitude sensor, an airspeed sensor, or a combination thereof.

In some embodiments, the method further includes blocking the received EMC motor control signals from reaching the at least one ESC in response to the trigger event.

In some embodiments, the predetermined data protocol is one of a) universal asynchronous receiver/transmitter (UART), b) three-wire pulse-width modulation (PWM), or c) Inter-Integrated Circuit (I2C).

According to various embodiments, an unmanned aerial vehicle (UAV) includes: at least one electronic speed controller (ESC) configured to use a predetermined data protocol; an existing motor controller (EMC) configured to transmit EMC motor control signals in accordance with the predetermined data protocol to the at least one ESC; and a safety motor controller (SMC) coupled between the at least one ESC and the EMC, the SMC configured to: receive the EMC motor control signals from the EMC; detect a trigger event; and transmit SMC motor control signals corresponding to at least one of the EMC motor control signals in accordance with the predetermined data protocol to the at least one ESC in response to the trigger event.

According to various embodiments, an apparatus for controlling an unmanned aerial vehicle (UAV) including a safety motor controller (SMC) coupled between at least one electronic speed controller (ESC) configured to use a predetermined data protocol and an existing motor controller (EMC) configured to transmit EMC motor control signals in accordance with the predetermined data protocol to the at least one ESC, the system including: means for receiving the EMC motor control signals from the EMC; means for detecting a trigger event; and means for transmitting SMC motor control signals corresponding to at least one of the EMC motor control signals in accordance with the predetermined data protocol to the at least one ESC in response to the trigger event.

DETAILED DESCRIPTION

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

In general, various embodiments relate to systems and methods associated with a safety motor controller (SMC) for vehicles and, in some embodiments, for unmanned vehicles (UVs) capable of travelling by ground, water, and/or air. Particular embodiments relate to unmanned aerial vehicles (UAVs) having an SMC coupled between an existing motor controller (EMC) of a UAV and motors of the UAV and configured to take control of the UAV from the EMC in response to a trigger event.

Embodiments described herein can provide various benefits, including a cost-effective and easily installable SMC module. In some embodiments, the SMC may be compatible with a variety of existing and future vehicle types (e.g., UVs and UAVs) and configured to take control of vehicles such that the vehicle may comply with safety requirements of a regulating entity (e.g., the Federal Aviation Administration (FAA) or air traffic control (ATC)). As such, instead of individual manufacturers and/or users having to develop or program vehicles to comply with evolving safety regulations, the individual manufacturers and/or users may simply install an SMC into their existing vehicles, between an EMC and motors of those vehicles.

Figure 1:
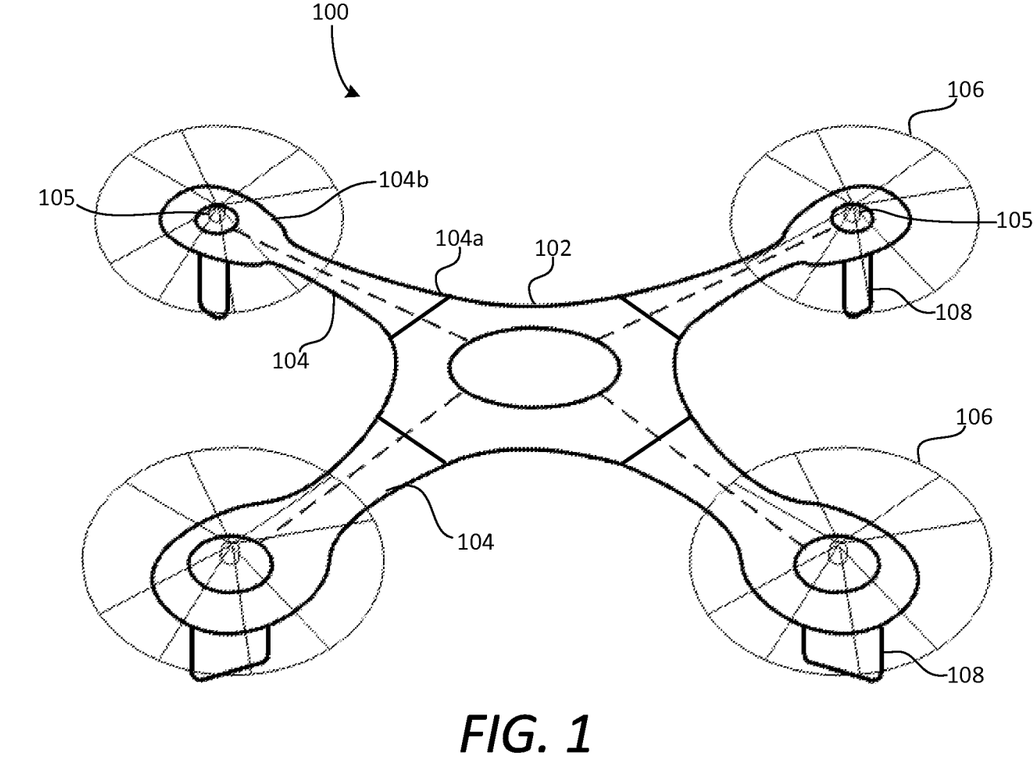
FIG. 1 illustrates a perspective view of an unmanned aerial vehicle according to various embodiments.

FIG. 1 illustrates a perspective view of an unmanned aerial vehicle 100 according to various embodiments. In some embodiments, the UAV 100 may include a main body 102. The UAV 100 may further include a plurality of extended portions or "arms" 104 that extend from the main body 102. Each of the arms 104 may have a first end 104a that is attached to the main body 102. Although some embodiments include four arms 104 extending from the main body 102, in other embodiments, UAVs may include any suitable number of arms. For example, further embodiments may include or employ a UAV having one arm, two arms, three arms, or more than four arms. Other embodiments may include or employ a UAV having no arms, for example, that is configured as a helicopter-style UAV, or other configurations having one or more propellers at its main body 102.

The main body 102 and the arms 104 of the UAV 100 may be made of any suitable materials, including, but not limited to, plastic, metal, wood, ceramic, composite material, or combinations thereof. In particular embodiments, at least a portion of (or the entire) structure of one or more (or each) arm 104 is composed of a circuit board material or substrate, on which one or more electrically conductive traces or other electrical circuit components are formed. In further embodiments, at least a portion of the main body 102 is composed of a circuit board material or substrate. In various embodiments, the traces at the arms 104 may be used for, for example, but not limited to, transmitting power and/or control signals from a power source and/or motor controller to motors 105 or electronic speed controllers coupled to the motors 105 of the UAV 100.

In some embodiments, the UAV 100 includes propellers 106 (e.g., a rotor having propeller blades) secured to each arm 104, at or near a second end 104b of each arm 104, opposite the first arm end 104a. The propellers 106 may be configured to provide aerial propulsion to the UAV 100 such that the UAV 100 is capable of flight and maneuvering during flight. In some embodiments, the propellers 106 are located on top of the arms 104, at the second ends 104b of the arms 104. In other embodiments, the propellers 106 may be provided at other suitable locations, such as, but not limited to, below the arms 104, at end surfaces of the arms 104, or within openings in the arms 104. Each propeller 106 may be coupled to a respective motor 105. The motors 105 may be configured to drive and spin the propellers 106 at speeds sufficient for the UAV 100 to achieve aerial propulsion. For example, the motors 105 may include, but not be limited to, alternating current (AC) electric motors, direct current (DC) electric motors, brushless motors, brushed motors, or any other suitable motor for use in UAV 100 for achieving aerial propulsion.

In addition, the UAV 100 may have a plurality of legs 108, including a leg 108 at the bottom of each arm 104, at or near the second end 104b. The legs 108 may support the UAV 100 in an upright or standing orientation (an orientation from which the UAV 100 is capable of lifting off under the power of the propellers 106), when the UAV 100 is on the ground and not in flight.

Figure 4:
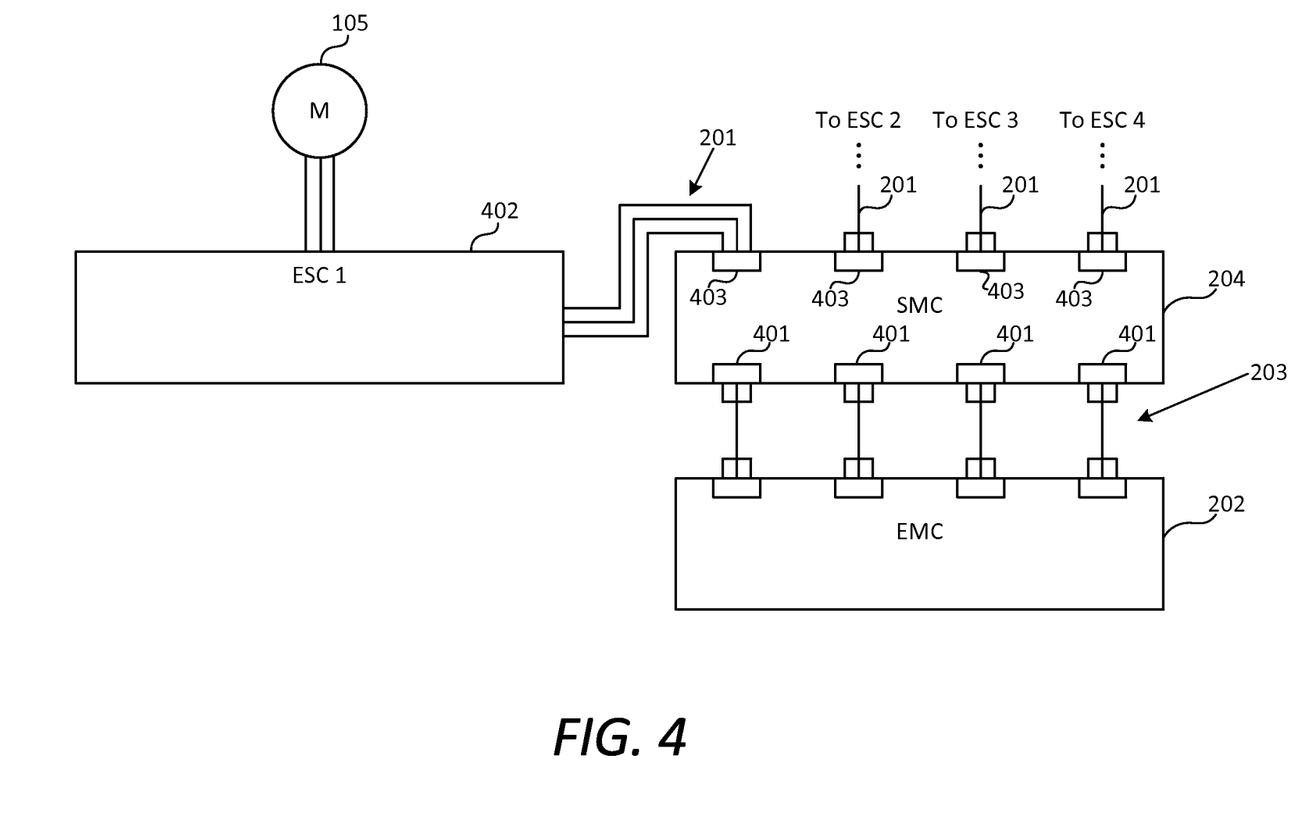
FIG. 4 illustrates a schematic view of a wiring configuration of an unmanned aerial vehicle including a safety motor controller according to various embodiments.

In some embodiments, one or more of the motors 105 may each be coupled to an electronic speed controller (ESC) (e.g., 402 in FIG. 4). In particular embodiments, each of the motors 105 is coupled to a respective ESC such that the number of motors 105 in the UAV 100 equals the number of ESCs. The ESC may be configured to provide high frequency 3-phase AC to a coupled motor 105, such that each of the propellers 106 that are powered by the motors 105 may achieve highly responsive variable speed for increased precision of control, maneuverability, acceleration, and deceleration of the UAV 100 during flight.

By way of examples, the altitude of the UAV 100 may be determined by the amount of power provided to all motors 105 via the ESCs for driving the propellers 106. Forward movement of the UAV 100 may be achieved by driving rear propellers 106 (e.g., the propellers 106 located in a direction opposite the forward momentum of the UAV 100) faster than forward propellers 106 (e.g., the propellers 106 located in a same direction as the forward momentum of the UAV 100). Sideways lateral movement of the UAV 100 may be achieved by driving left propellers 106 if traveling left, and right propellers 106 if traveling right, faster than the propellers 106 at the opposite side of the UAV 100 from the faster-driven propellers 106. In addition, rotational movement (e.g., yaw movement) of the UAV 100 may be achieved by slowing or speeding individual propellers 106.

Although the UAV 100 may include propellers 106 in some embodiments, other embodiments may employ other suitable aerial propulsion systems including, but not limited to, a ducted fan system, a jet engine system, and/or the like. Although some embodiments of the UAV 100 have a multi-arm configuration, other embodiments may include or operate with other UAV configurations, such as, but not limited to, helicopter-style UAVs, airplane-style UAVs (e.g., fixed-winged UAVs), zeppelin or blimp-style UAVs, and/or other multicopter-style UAVs. Also, while some embodiments are described herein with reference to UAVs, other embodiments may include or employ other types of aerial vehicles, including manned vehicles. In addition, some embodiments of vehicles may be capable of travel by land and/or water instead of, or in addition to, aerial travel.

Figure 2A:
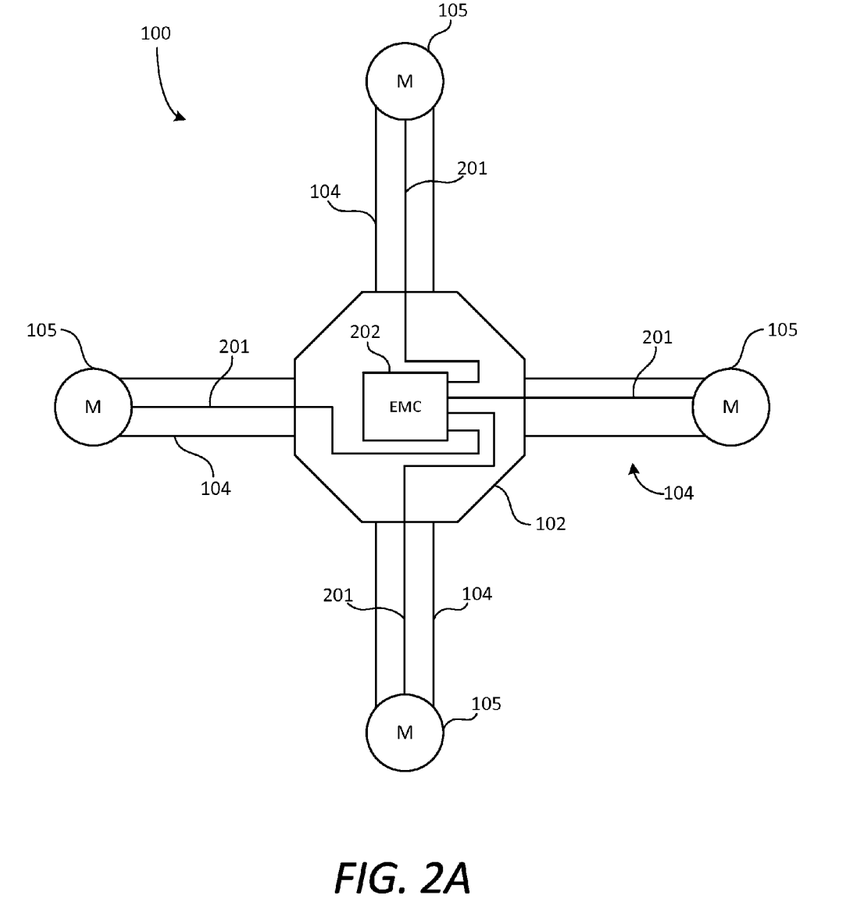
FIG. 2A illustrates a top view of an unmanned aerial vehicle.

FIG. 2A illustrates a top view of an unmanned aerial vehicle 100. With reference to FIGS. 1-2A, the UAV 100 may include an existing motor controller (EMC) 202 located at the main body 102 of the UAV 100. The EMC 202 may be a component or module of the UAV 100 that is pre-installed in the UAV 100 by an original manufacturer or a user. In some embodiments, the EMC 202 is located in the main body 102, while in other embodiments, the EMC 202 may be located at any other suitable location on the UAV 100, such as, but not limited to, the arm 104 or the motor 105. The EMC 202 may be configured to transmit motor control signals (e.g., EMC motor control signals) to each of the motors 105 via respective one or more electrical conductor 201, such as, but not limited to, electrical wiring, traces, and/or the like. In some embodiments, the UAV 100 may include four separate one or more electrical conductors 201 corresponding to four different motors 105. In other embodiments, the UAV 100 may include any suitable number of one or more electrical conductors 201 according to the number of motors 105 at the UAV 100, such as, but not limited to, two of the one or more electrical conductors 201 for a UAV including two motors, five of the one or more electrical conductors 201 for a UAV including five motors, and so on.

As such, the EMC 202 may dictate various flight characteristics of the UAV 100, such as, but not limited to, speed, trajectory, rotation, altitude, and attitude of the UAV 100 in controlling each of the motors 105 (e.g., via respective coupled ESCs), which, in turn, controls respective propellers 106. For example, in some embodiments, the EMC 202 may control a speed at which each individual propeller 106 rotates for achieving a desired speed, direction, or altitude of the UAV 100 during flight by controlling a respective motor 105 associated with each of the individual propellers 106. In further embodiments, the UAV 100 may include propellers 106 that are capable of physically and mechanically tilting at various angles with respect to the arms 104 to provide even finer control of the UAV 100 during flight. As such, the EMC 202, in addition to controlling the rotational speed of each of the propellers 106, may also control the angle at which each individual propeller 106 tilts, for even finer control of the UAV 100.

In some embodiments, the UAV 100 may be controlled remotely by a user using a user device, such as, but not limited to, a tablet, a mobile phone, a laptop, etc. The user, via the user device, may input flight commands to be implemented by the UAV 100. In particular embodiments, the user commands may be received by the EMC 202, and, in turn, the EMC 202 may transmit corresponding motor control signals to ESCs coupled to the motors 105 in carrying out the received user commands. In other embodiments, a defined flight path may be pre-programmed into the EMC 202, which may direct the flight of the UAV 100 during a flight session.

Figure 2B:
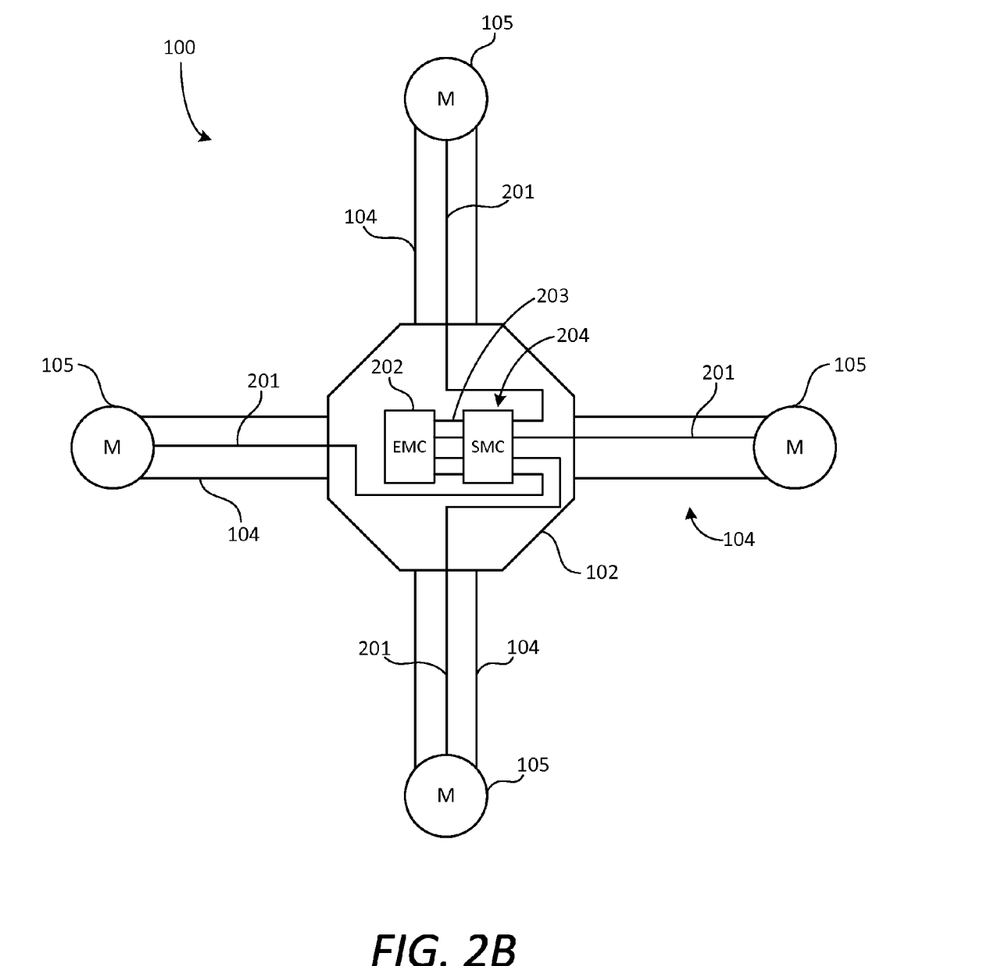
FIG. 2B illustrates a top view of an unmanned aerial vehicle according to various embodiments.

FIG. 2B illustrates a top view of an unmanned aerial vehicle 100 according to various embodiments. Referring to FIGS. 1-2B, the UAV 100 may further include a safety motor controller (SMC) 204 coupled to the EMC 202. In some embodiments, the EMC 202 and the SMC 204 may be coupled together, for example, by one or more electrical conductors 203, such as, but not limited to, electrical wiring, traces, and/or the like. Similarly, in some embodiments, the SMC 204 may be coupled to each of the motors 105 by the one or more electrical conductor 201. In other embodiments, the SMC 204 may be coupled to some of the motors 105 and not to others of the motors 105, such as, but not limited to, one motor 105, two motors 105, or three motors 105. In some embodiments, the UAV 100 may include four separate one or more electrical conductors 203 corresponding to the four different motors 105. In other embodiments, the UAV 100 may include any suitable number of one or more electrical conductors 203 according to the number of motors 105 at the UAV 100, such as, but not limited to, two of the one or more electrical conductors 203 for a UAV including two motors, five of the one or more electrical conductors 203 for a UAV including five motors, and so on. In further embodiments, the UAV 100 may include a power source (not shown) (e.g., at the main body 102) for supplying power to the motors 105 (e.g., via the one or more electrical conductors 201), the EMC 202, and the SMC 204.

Accordingly, in particular embodiments, the SMC 204 may be located (e.g., installed or coupled) between the EMC 202 and the motors 105 of the UAV 100, such that the motor control signals that were previously transmitted from the EMC 202 to the motors 105 are relayed or otherwise communicated from the EMC 202 to the motors 105 via the SMC 204. In other words, in some embodiments, the SMC 204 may receive the motor control signals from the EMC 202, and the SMC 204 passes or otherwise communicates the same or corresponding motor control signals to the motors 105 (instead of the EMC 202 sending motor control signals directly to the motors 105 of the UAV 100). In particular embodiments, the SMC 204 may provide further functions with respect to the EMC motor control signals, such as, but not limited to, blocking some or all of the EMC motor control signals from reaching some or all of the motors 105, replacing some or all of the EMC motor control signals with other motor control signals, modifying some or all of the EMC motor control signals, monitoring of the EMC motor control signals, rerouting the EMC motor control signals to different motors, and the like.

In further embodiments, the SMC 204 may be configured to be easily and compatibly installed between the EMC 202 and the motors 105 (or the ESCs coupled to the motors 105). To this end, the SMC 204 may be configured to include input ports for receiving the motor control signals from the EMC 202, and output ports for transmitting motor control signals to the motors 105. In particular embodiments, the input ports of the SMC 204 may be configured to match or otherwise correspond to the motor control signal output ports of the EMC 202. Similarly, the output ports of the SMC 204 also may be configured to match or otherwise correspond to the motor control signal output ports of the EMC 202. In such embodiments, the SMC 204 may be coupled between the EMC 202 and the motors 105 by decoupling the output ports of the EMC 202 (e.g., in FIG. 2A) from the motors 105, and then coupling the same output ports of the EMC 202 to the corresponding input ports of the SMC 204 and coupling the output ports of the SMC 204 to the motors 105 (as shown in FIG. 2B).

Accordingly, in some embodiments, the SMC 204 may be manufactured to be a separate after-market component that original manufacturers, after-market manufacturers and/or users of vehicles (such as, but not limited to, UAVs) can easily install, while maintaining the original functionality and capabilities of their original vehicles. In other words, in some embodiments, the SMC 204 may be configured to be installed in "legacy" vehicle systems (e.g., legacy UAV systems) for upgrading of those systems (e.g., to implement new requirements imposed by a regulatory entity, such as, but not limited to the FAA). As such, the SMC 204 may provide additional functionality to the UAV 100, without modification to the EMC 202 or the motors 105 of the UAV 100. In other embodiments, the SMC 204 may be included in the UAV 100 by the original manufacturer of the UAV 100. In yet further embodiments, the SMC 204 may be configured as part of the EMC 202, instead of being a separate module.

Figure 3:
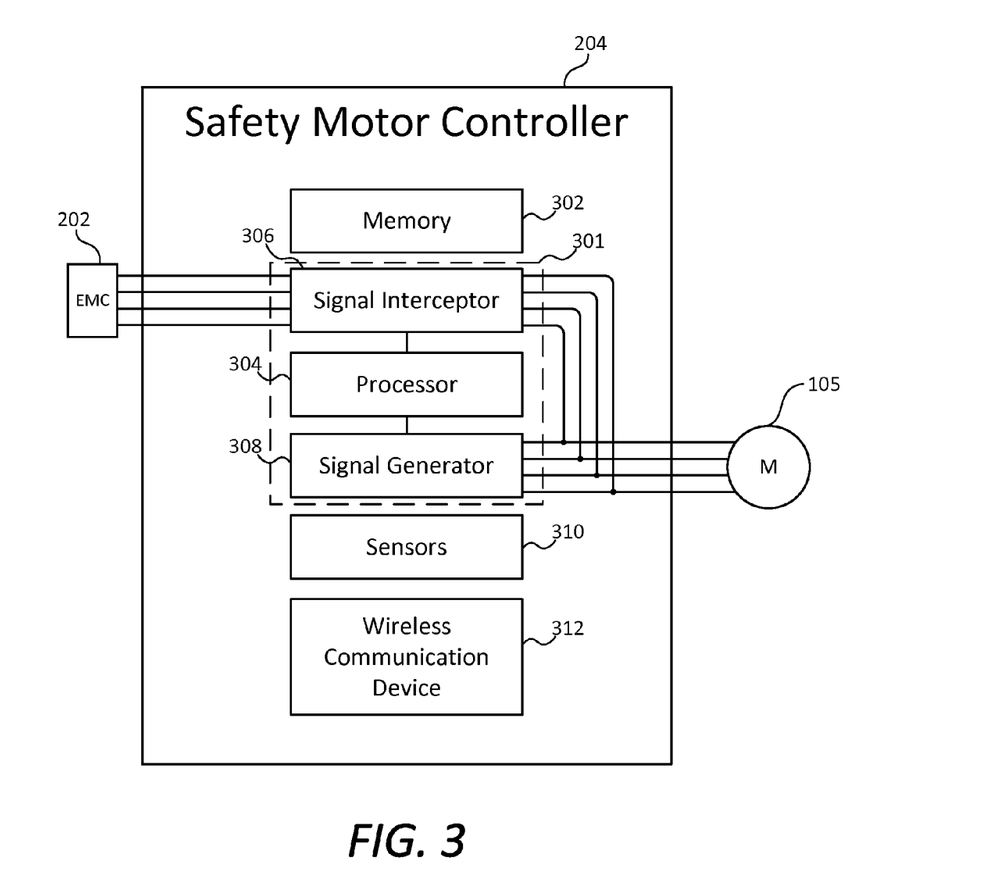
FIG. 3 illustrates a block diagram of a safety motor controller according to various embodiments.

FIG. 3 illustrates a block diagram of the SMC 204 according to various embodiments. Referring to FIGS. 1-3, the SMC 204 may include a memory 302, a processor 304, a signal interceptor 306, a signal generator 308, sensors 310, and a wireless communication device 312. The processor 304, the signal interceptor 306, and the signal generator 308 may be included as processing electronics 301 of the SMC 204. The memory 302 and the processor 304 may operate with each other to store and run software related to controlling the operation of the SMC 204. For example, the processor 304 may process software and/or data stored on the memory 302, where such software may control the processor and other components of the SMC 204 to perform functions of the SMC 204.

According to some embodiments, the memory 302 may be a non-transitory processor-readable storage medium that stores processor-executable instructions. The memory 302 may include any suitable internal or external device for storing software and data. Examples of the memory 302 may include, but are not limited to, random access memory (RAM), read only memory (ROM), floppy disks, hard disks, dongles, or other recomp sensor board (RSB) connected memory devices, or the like. The memory 302 may store an operating system (OS), user application software, and/or executable instructions. The memory 302 may also store application data, such as, but not limited to, an array data structure.

According to some embodiments, the processor 304 may be a general-purpose processor. The general-purpose processor 304 may include any suitable data processing device, such as, but not limited to, a microprocessor. In the alternative, the general-purpose processor 304 may be any suitable electronic processor, controller, microcontroller, or state machine. The general-purpose processor 304 may also be implemented as a combination of computing devices (e.g., a combination of a digital signal processor (DSP) and a microprocessor, a plurality of microprocessors, at least one microprocessor in conjunction with a DSP core, or any other suitable configuration).

In some embodiments, the signal interceptor 306 may be directly or indirectly coupled to the EMC 202 such that the EMC motor control signals pass through the signal interceptor 306 before reaching one or more of the motors 105. Accordingly, the signal interceptor 306 may be configured to monitor the received EMC motor control signals. For example, the signal interceptor 306 may monitor whether the EMC 202 has stopped sending motor control signals during a flight session for a threshold period of time (e.g., indicating that there may be a malfunction with the EMC 202), and if the time period of inactivity of the EMC 202 exceeds the threshold, the SMC 204 may take over control of the UAV 100.

In further embodiments, the signal interceptor 306 of the SMC 204 may be configured to manipulate the received EMC motor control signals. For example, the signal interceptor 306 may be configured to block all of the received EMC motor control signals from reaching the motors 105, selectively block some (but not all) of the received EMC motor control signals from reaching the motors 105 while allowing other received EMC motor control signals to pass to the motors 105, selectively block the received EMC motor control signals from reaching some (but not all) of the motors 105 while allowing the received EMC motor control signals to pass to other motors 105, modify some or all of the received EMC motor control signals and output one or more modified EMC motor control signals, reroute particular EMC motor control signals originally directed to a particular motor 105 to another motor 105 different from the original motor 105 (e.g., an auxiliary back-up motor), or the like. In some embodiments, the processor 304 may be coupled to the signal interceptor 306 for monitoring and manipulating the received EMC motor control signals. In other embodiments, the processor 304 may be directly connected to the EMC 202 and perform the functions of the signal interceptor 306.

In various embodiments, the signal generator 308 may be configured to generate motor control signals (e.g., SMC motor control signals) that may be different from the motor control signals generated by the EMC 202. The SMC 204 may be configured to transmit the SMC motor control signals to the motors 105 via the one or more electrical conductor 201. In other embodiments, the SMC 204 may be configured to transmit the SMC motor control signals to ESCs coupled to each respective motor 105 via the respective one or more electrical conductor 201. In particular embodiments, the SMC motor control signals may use the same data protocol (e.g., a predetermined data protocol) as that of the EMC motor control signals, such that the SMC motor control signals are compatible with the motors 105 or the ESCs coupled to the motors 105. In some embodiments, the processor 304 may be coupled to the signal generator 308 for generating the SMC motor control signals. In other embodiments, the processor 304 may be directly connected to the motors 105 (or ESCs coupled thereto) and perform the functions of the signal generator 308.

In some embodiments, the SMC 204 further includes the plurality of sensors 310 for monitoring characteristics of the UAV 100. The plurality of sensors 310 may include, but not be limited to, an inertial measurement unit (IMU), a global positioning system (GPS), a barometric pressure sensor, a temperature sensor, an altitude sensor, an airspeed sensor, a camera, an optic flow sensor, an environmental sensor, a clock, or any other suitable sensor for monitoring characteristics of the UAV 100 (such as, but not limited to, velocity, attitude, orientation, acceleration, rotational speed, momentum, gravitational force, location, altitude, and the like of the UAV 100), environmental characteristics outside of the UAV 100 (such as, but not limited to, atmospheric pressure, temperature, weather, wind, velocity, time of day, and the like).

According to various embodiments, the sensors 310 may be configured to generally detect a parameter associated with the UAV 100. In conjunction with the detecting of the parameter by the sensors 310, the processor 304 may generally determine whether or not the sensed parameter meets or exceeds a threshold or otherwise corresponds to a trigger event. If the processor 304 determines that the parameter meets or exceeds a threshold or otherwise corresponds to a trigger event, in response, the processor 304 may generally control the SMC 204 to take a predefined action.

Examples of trigger events detectable by the SMC 204 include, but are not limited to, a geo-fence violation (e.g., by locating the UAV 100 using the GPS and detecting whether the UAV 100 is flying in a restricted area), a mechanical or EMC 202 software failure (e.g., by detecting an abnormal flight pattern of the UAV 100), pilot error (e.g., by detecting abnormal flight of the UAV 100), and the like. Examples of abnormal flight patterns of the UAV 100 that may be indicative of a problem with the UAV 100 and detectable by the sensors 310 include, but are not limited to, sudden decelerations, sudden drops in altitude, severe oscillations or vibrations, and the like.

To detect an abnormal flight pattern, in some embodiments, corresponding thresholds may be associated with each sensor or characteristic of the UAV 100 such that the SMC 204 does not detect an abnormal flight pattern as a trigger event unless a measurement exceeds a threshold associated with the sensor or characteristic. For example, in some embodiments, the SMC 204 may detect an abnormal flight pattern as a trigger event if a downward acceleration of the UAV 100 exceeds a predetermined acceleration threshold. According to various embodiments, the various thresholds associated with the sensors 310 or characteristics may be stored in the memory 302, for access by the processor 304. In some embodiments, the thresholds may be programmed into the memory 302 by a manufacturer or a user, and/or may be later modified by a manufacturer or a user, as desired.

As such, in various embodiments, the SMC 204 may indirectly detect problems with the UAV 100 by relying on measurements associated with characteristics of the UAV 100 and of the surrounding environment, and not by determining the problem itself (e.g., a sudden descent in altitude may indicate a number of problems at the UAV 100, including pilot error, software malfunction, mechanical malfunction, and the like, but the effect of the problem, i.e., the drop in altitude, causes the SMC 204 to detect that a problem has occurred).

According to some embodiments, in response to detecting the trigger event, the SMC 204 may take the predefined action and command the UAV 100 to perform a corresponding evasive action. In particular embodiments, the SMC 204 may cause the UAV 100 to perform the evasive action by blocking the EMC motor control signals from reaching the motors 105 (e.g., at the signal interceptor 306), and by transmitting SMC motor control signals to the motors 105 (or to ESCs coupled to the motors 105). Examples of evasive actions by the UAV 100 include, but are not limited to, returning to a launch site, immediately landing, disabling operation of some or all of the motors 105, slowing down some or all of the motors 105, and the like.

In some embodiments, the SMC 204, may control auxiliary components of the UAV 100 as part of the evasive action. For example, the SMC 204 may deploy a parachute attached to the UAV 100 in response to a trigger event. In further embodiments, the SMC 204 may block the EMC motor control signals from reaching the motors 105, in addition to deploying the parachute.

By way of example, if the SMC 204 detects a geo-fence violation trigger event by the UAV 100, the SMC 204 may take over control of the UAV 100 and command the UAV 100 to return to its launch site, constituting the evasive action. As another example, if the SMC 204 detects a sudden intense vibration (i.e., a vibration exceeding a stored threshold at the SMC 204) of the UAV 100 (e.g., indicating a crash), the SMC 204 may command the UAV 100 to disable its motors 105 by blocking the EMC motor control signals from reaching the motors 105, to minimize damage to the UAV 100 once the UAV 100 is grounded. Thus, according to various embodiments, by monitoring environmental and flight characteristics using the sensors 310, the SMC 204 may be able to independently determine when (e.g., under what circumstances) to block EMC motor control signals at the signal interceptor 306, and the SMC motor control signals to transmit to the motors 105 from the signal generator 308, in place of the EMC motor signals. In particular embodiments, the SMC 204 may detect a trigger event using the sensors 310, and cause the UAV 100 to perform an evasive action in response to detecting the trigger event by blocking the EMC motor control signals at the signal interceptor 306 and transmitting SMC motor control signals corresponding to the evasive action to the motors 105 (or to ESCs coupled to the motors 105).

According to some embodiments, the SMC 204 may include the wireless communication device 312. In some embodiments, the wireless communication device 312 may include a receiver, a transmitter, or a transceiver, corresponding to a particular radio frequency (RF) band, for communication in a wireless communication network. Examples of a wireless communication device 312 include, but are not limited to, a wireless local area network (WLAN) device, a wireless wide area network (WWAN) device, a personal area network (PAN) device, and/or the like. The wireless communication device 312 may be configured to facilitate wireless communication between the UAV 100 and other devices separate from the UAV 100 such as, but not limited to, a user device, another UAV, a central entity (e.g., the FAA or ATC), a server, and/or the like. In particular embodiments, the wireless communication device 312 may be configured to transmit and/or receive radio signals corresponding to wireless protocols such as, but not limited to, Wi-Fi, Bluetooth, Long-Term Evolution (LTE), Code Division Multiple Access (CDMA), Wideband Code Division Multiple Access (WCDMA), Global Systems for Mobile Communications (GSM), any other suitable wireless communication protocol, and/or combinations thereof. In some embodiments, the processor 304 may be coupled to the wireless communication device 312 for receiving and/or transmitting radio frequency signals. In other embodiments, the processor 304 may perform the functions of the wireless communication device 312 such that a separate wireless communication device 312 module may not be used.

FIG. 4 illustrates a schematic view of a wiring configuration of the unmanned aerial vehicle 100 (FIGS. 1-3) including the safety motor controller 204 according to various embodiments. Referring to FIGS. 1-4, the UAV 100 may include an electronic speed controller (ESC) coupled between each motor 105 and the SMC 204, resulting in a first ESC 402 coupled to one of the motors 105 (a first motor) and three additional ESCs (ESC 2, ESC 3, ESC 4) coupled to respective ones of the remaining three motors 105. In various embodiments, the SMC 204 may include input ports 401 coupled to the EMC 202, and output ports 403 coupled to the ESC 402. In some embodiments, the SMC 204 may include four separate input ports 401 and four separate output ports 403 corresponding to the four different motors 105. In other embodiments, the SMC 204 may include any suitable number of input ports 401 and output ports 403 according to the number of motors 105 at the UAV 100, such as, but not limited to, two input ports 401 and two output ports 403 for a UAV including two motors, five input ports 401 and five output ports 403 for a UAV including five motors, and so on.

According to some embodiments, the EMC 202 may transmit the EMC motor control signals to the input ports 401 of the SMC 204 (e.g., to the signal interceptor 306) via the one or more electrical conductor 203, and the SMC 204 may subsequently transmit the EMC motor control signals (or modified EMC motor control signals) to the ESC 402 (and other ESCs) through the output ports 403 of the SMC 204 via the one or more electrical conductor 201. Alternatively, in situations where the SMC 204 blocks some or all of the EMC motor control signals from reaching the ESC 402, the SMC 204 may transmit SMC motor control signals (e.g., generated by the signal generator 308) through the output ports 403 to the ESC 402 via the one or more electrical conductor 201.

According to various embodiments, the input ports 401 of the SMC 204 may be configured to have connections or hardware compatible with the EMC 202, and the output ports 403 of the SMC 204 may be configured to have connections or hardware compatible with the ESC 202. In other words, in various embodiments, the SMC 204 may be configured (e.g., have hardware configured) to use the same predetermined data protocol as that of the EMC 202 and the ESC 402, such that the SMC 204 may be installed between the EMC 202 and the ESC 402 with minimal disruption to the operation of the UAV 100 (e.g., to the transmission of the EMC motor control signals to the ESC 402). In some embodiments, the predetermined data protocol may be pulse-width modulation (PWM) that uses a 3-wire connection (e.g., at the one or more electrical conductors 201 and 203). Accordingly, in such embodiments, the input ports 401 and the output ports 403 of the SMC 204 may be configured for PWM, and include connection locations configured to be compatible with S-wire conductors.

According to other embodiments, other data protocols may be used in the UAV 100 including, but not limited to, Universal Asynchronous Receiver Transmitter (UART) and Inter-Integrated Circuit (I2C). UART is a serial data protocol (e.g., data is sent spread over time, for example, one single bit after another). UART uses a single data line for transmitting and another data line for receiving data. As such, in UART system embodiments, one or more electrical conductors 201 and 203 may include two separate electrical wires, as opposed to the three wires associated with PWM. In embodiments having a UART environment, communicating hardware may agree on the transmission speed or bit rate, as this data protocol is asynchronous. Other embodiments may utilize Universal Synchronous/Asynchronous Receiver Transmitter (USART), which is similar to UART, but also utilizes a clock for synchronization. Accordingly, in embodiments using USART data protocols, three separate electrical wires (e.g., at the one or more electrical conductors 201 and 203) may be used: two for transmitting and receiving data and a third for the clock. In other embodiments, the UAV 100 may utilize other serial data protocols, such as, but not limited to, serial data protocols that use four wires. In other embodiments, I2C, which is also a synchronous protocol similar to USART, may be utilized. In such I2C embodiments, two wires (e.g., at the one or more electrical conductors 201 and 203) may be used: one for a clock and one for data. Accordingly, the connection locations at the input ports 401 and the output ports 403 of the SMC 204 may be manufactured to be compatible with various data protocols using any suitable number of conductors.

In some embodiments, the one or more electrical conductor 203 may include an additional electrical connection between the EMC 202 and the SMC 204. The additional electrical connection may be configured to transmit a periodic signal (e.g., a "heartbeat" signal) from the EMC 202 to the SMC 204. As such, if the SMC 204 fails to receive the heartbeat signal from the EMC 202 through the additional electrical connection, a trigger event may occur and the SMC 204 may then take over control of the UAV 100 and command the UAV 100 to perform an evasive action. In such embodiments, the responsiveness of the SMC 204 to a malfunction at the EMC 202 may be improved. In yet further embodiments, an additional conductor having a circuit breaker may be located between the motor 105 and the SMC 204. In such embodiments, the SMC 204 may control activation of a circuit breaker in response to a trigger event, and consequently remove power from the motor 105.

Although not shown, similar connection configurations as those shown with respect to ESC 402 may be implemented in connection with ESC 2, ESC 3, and ESC 4.

Figure 5A:
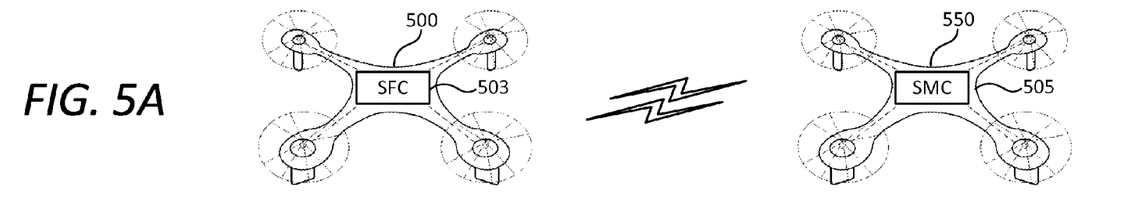
FIG. 5A illustrates a schematic view of wireless communication between unmanned aerial vehicles according to various embodiments.

FIG. 5A illustrates wireless communication between unmanned aerial vehicles 500 and 550 (which may correspond to the UAV 100 in FIGS. 1-4) according to various embodiments. Referring to FIGS. 1-5A, each of the UAVs 500 and 550 includes an SMC 503 and 505 (which may correspond to the SMC 204 in FIGS. 2B-4), respectively. In some embodiments, each of the SMCs 503 and 505 may include a wireless communication device 312, as described above. Accordingly, the UAV 500, using the wireless communication device 312, may be configured to communicate with other UAVs. For example, when UAV 500 is proximate UAV 550 during flight, UAV 550 may communicate information or an alert to UAV 500, for example, for collision avoidance purposes. In some embodiments, the shared information may include, but not be limited to, information regarding location, flight path, velocity, and/or the like. In other embodiments, the UAV 500 may communicate with other flying vehicles other than, or in addition to, UAVs, such as, but not limited to, airplanes, helicopters, non-rigid airships, weather balloons, and the like.

Figure 5B:
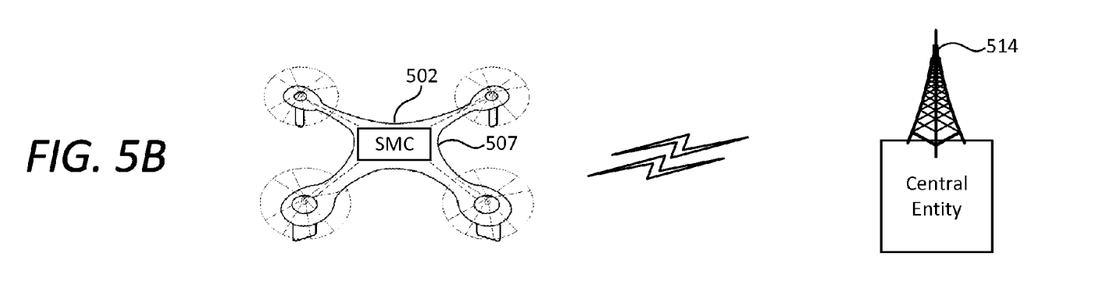
FIG. 5B illustrates a schematic view of wireless communication between an unmanned aerial vehicle and a central entity according to various embodiments.

FIG. 5B illustrates wireless communication between an unmanned aerial vehicle 502 (which may correspond to the UAV 100, 500, 550 in FIGS. 1-5A) and a central entity 514 according to various embodiments. Referring to FIGS. 1-5B, the UAV 502 may include an SMC 507 (which may correspond to the SMC 204 in FIGS. 2B-4), and the SMC 507 may include a wireless communication device 312, as described above. In some embodiments, the UAV 502 may communicate with a remote entity or central entity 514. In various embodiments, the central entity 514 may include, but not be limited to, the FAA or ATC. In some embodiments, the central entity 514 may transmit emergency alerts to the UAV 502 for processing by the SMC 507, and, depending on the alert, may detect a trigger event and command the UAV 502 to take an evasive action. For example, the FAA may send the UAV 502 an emergency alert indicating that the airspace that the UAV 502 currently occupies is to be evacuated immediately. As such, the SMC 507 may take control of the UAV 502 and command the UAV 502 to land immediately or to fly to an unrestricted airspace. In other embodiments, the central entity 514 may remotely disable operation of the UAV 502 via the wireless communication device 312 of the SMC 507 until a particular event occurs (e.g., when the UAV 502 achieves FAA certification, when the UAV 502 passes a mandatory inspection, when weather conditions improve, etc.), and the central entity 514 may transmit a flight authorization to the SMC 507 of the UAV 502 in response to the event occurring.

In some embodiments, the UAV 502, via the SMC 507, may implement always-on telemetry data that is to be continuously or periodically transmitted to the central entity 514 for monitoring. In various embodiments, the telemetry data may include, but not be limited to, information about the UAV 502 regarding its location, flight path, velocity, altitude, and/or the like. As such, the central entity 514 may constantly monitor the UAV 502 and, in some embodiments, send an alert to the SMC 507 of the UAV 502 in case of an emergency. In other embodiments, the central entity 514 may take control of the UAV 502 via the SMC 507, for example, in the event of an emergency, and control the UAV 502 remotely via the SMC 507. In further embodiments, the SMC 507 may transmit a flight path generated by a user of the UAV 502 to the central entity 514 for approval, and the UAV 502 may await authorization to fly based on the pending approval.

In some embodiments, the central entity 514 may be an owner, as a private company, of the UAV 502 (e.g., a UAV fleet manager that rents UAVs to users). In such embodiments, the fleet manager may remotely take control of the UAV 502 (e.g., in the event that the UAV 502 is overdue for return to the central entity 514, or a bill for rental of the UAV 502 is unpaid). In other embodiments, the central entity 514 may be an owner of the UAV 502 (e.g., a research institution) and the telemetry data of the UAV 502 may include environmental measurements of surroundings of the UAV 502. In such embodiments, the central entity 514 may monitor the UAV 502 and the measured data taken by the UAV 502. In further embodiments, the central entity 514 may actively alter a flight path of the UAV 502 via the SMC 507 in response to the data measured by the UAV 502 (e.g., if a particular location is in need of further surveillance).

Figure 5C:
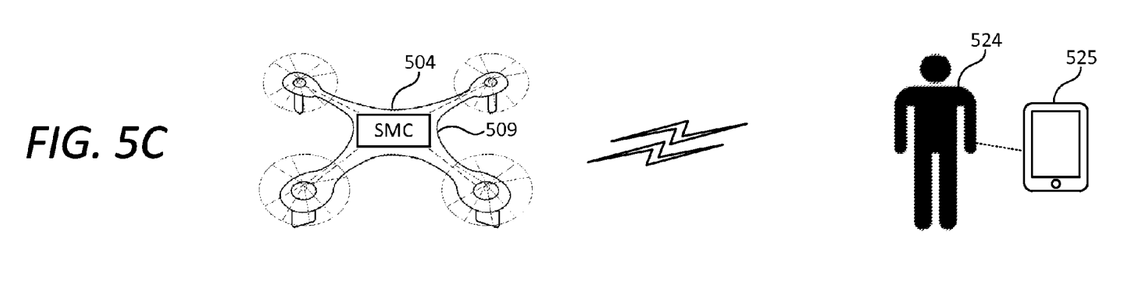
FIG. 5C illustrates a schematic view of wireless communication between an unmanned aerial vehicle and a user according to various embodiments.

FIG. 5C illustrates wireless communication between the unmanned aerial vehicle 504 (which may correspond to the UAV 100, 500, 502, 550 in FIGS. 1-5B) and a user 524 according to various embodiments. Referring to FIGS. 1-5C, the UAV 504 may include an SMC 509 (which may correspond to the SMC 204 in FIGS. 2B-4), and the SMC 509 may include a wireless communication device 312, as described above. According to some embodiments, the user 524 may remotely control flight of the UAV 504 through a user device 525. In such embodiments, the SMC 509 may transmit the telemetry data to the user for monitoring of the UAV 504 by the user. For example, if the user 524 controls the UAV 504 to be beyond the user's line of sight, the SMC 509 may constantly or periodically transmit location information to the user 524 via the user device 525.

Figure 6:
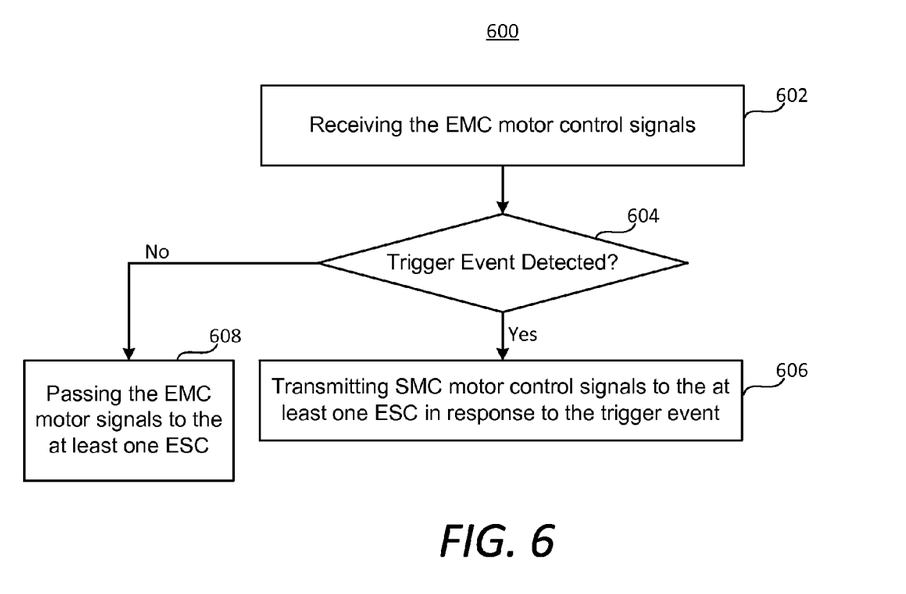
FIG. 6 illustrates a method of controlling an unmanned aerial vehicle according to various embodiments.

FIG. 6 illustrates a method 600 of controlling an unmanned aerial vehicle (e.g., 100, 500, 502, 504, 550 in FIGS. 1-5C) according to various embodiments. Referring to FIGS. 1-6, the method 600 may include, at block 602, receiving, at the SMC 204 (e.g., at processing electronics 301, such as the processor 304) the EMC motor control signals from the EMC 202. At block 604, the SMC 204 may detect a trigger event. In response to detecting a trigger event (604: Yes), at block 606, the SMC 204 may transmit SMC motor control signals corresponding to at least one of the EMC control signals in accordance with the predetermined data protocol to the at least one ESC 402. In some embodiments, the SMC 204 may block the received EMC motor control signals from reaching the at least one ESC 402 in response to the trigger event. Alternatively, in response to not detecting a trigger event (604: No), the SMC 204 may, at block 608, pass the EMC motor control signals to the at least one ESC.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The above used terms, including "attached," "connected," "fastened," "secured," "coupled," "integrated," and the like are used interchangeably. In addition, while certain embodiments have been described to include a first element as being "coupled" (or "attached," "connected," "fastened," etc.) to a second element, the first element may be directly coupled to the second element or may be indirectly coupled to the second element via a third element.

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, such as, but not limited to, a combination of a DSP and a microprocessor, a plurality of microprocessors, one or more microprocessors in conjunction with a DSP core, or any other such configuration. Alternatively, some steps or methods may be performed by circuitry that is specific to a given function.

In some example embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

What is claimed is:

1. A safety motor controller (SMC) for installing in an unmanned aerial vehicle (UAV) between at least one electronic speed controller (ESC) configured to use a predetermined data protocol and an existing motor controller (EMC) on the UAV configured to transmit EMC motor control signals in accordance with the predetermined data protocol to the at least one ESC to control operation of one or more motors on the UAV, the SMC comprising:
 an input port configured to receive the EMC motor control signals in accordance with the predetermined data protocol from the EMC on the UAV; and
 a processor configured to detect a trigger event and to transmit SMC motor control signals corresponding to at least one of the EMC motor control signals in accordance with the predetermined data protocol to the at least one ESC in response to the trigger event.

2. The safety motor controller of claim 1, wherein the trigger event comprises one or more of a geo-fence violation by the UAV, abnormal flight conditions of the UAV, and/or receipt of an emergency alert by the UAV.

3. The safety motor controller of claim 1, wherein the SMC motor control signals are configured to control the at least one ESC to cause the UAV to perform an evasive action in response to the trigger event.

4. The safety motor controller of claim 3, wherein the evasive action comprises one or more of returning to a launch site, landing immediately, ceasing operation of at least one motor coupled to the at least one ESC, or combinations thereof.

5. The safety motor controller of claim 1, further comprising a wireless communication device configured to:
constantly transmit telemetry data to a central entity; and
receive a command and/or an alert from the central entity.

6. The safety motor controller of claim 5, wherein:
the wireless communication device is further configured to receive flight authorization from the central entity; and
the SMC is configured to prevent flight of the UAV until the flight authorization is received.

7. The safety motor controller of claim 5, wherein the SMC is configured to change a flight plan of the UAV in response to receiving the command from the central entity.

8. The safety motor controller of claim 5, wherein the telemetry data comprises information about the UAV regarding location, flight path, velocity, and/or altitude.

9. The safety motor controller of claim 1, further comprising a plurality of sensors coupled to the processor and configured to detect the trigger event, the sensors comprising one or more of an inertial measurement unit (IMU), a global positioning system (GPS), a barometric pressure sensor, a temperature sensor, an altitude sensor, an airspeed sensor, or combinations thereof.

10. The safety motor controller of claim 1, wherein the processor is configured to block the received EMC motor control signals from reaching the at least one ESC in response to the trigger event.

11. The safety motor controller of claim 1, wherein the predetermined data protocol is one of a) universal asynchronous receiver/transmitter (UART), b) three-wire pulse-width modulation (PWM), or c) Inter-Integrated Circuit (I2C).

12. A method for controlling an unmanned aerial vehicle (UAV) comprising a safety motor controller (SMC) coupled between at least one electronic speed controller (ESC) configured to use a predetermined data protocol and an existing motor controller (EMC) on the UAV configured to transmit EMC motor control signals in accordance with the predetermined data protocol to the at least one ESC to control operation of one or more motors on the UAV, the method comprising:
receiving the EMC motor control signals from the EMC on the UAV;
detecting a trigger event; and
transmitting SMC motor control signals corresponding to at least one of the EMC motor control signals in accordance with the predetermined data protocol to the at least one ESC in response to the trigger event.

13. The method of claim 12, wherein the trigger event comprises one or more of a geo-fence violation by the UAV, abnormal flight conditions of the UAV, and/or receipt of an emergency alert by the UAV.

14. The method of claim 12, wherein the SMC motor control signals are configured to control the at least one ESC to cause the UAV to perform an evasive action in response to the trigger event.

15. The method of claim 14, wherein the evasive action comprises one or more of returning to a launch site, landing immediately, ceasing operation of at least one motor coupled to the at least one ESC, or a combination thereof.

16. The method of claim 12, further comprising:
constantly transmitting telemetry data to a central entity; and
receiving a command and/or an alert from the central entity.

17. The method of claim 16, further comprising:
receiving flight authorization from the central entity; and
preventing flight of the UAV until the flight authorization is received.

18. The method of claim 16, further comprising changing a flight plan of the UAV in response to receiving the command from the central entity.

19. The method of claim 16, wherein the telemetry data comprises information about the UAV regarding location, flight path, velocity, and/or altitude.

20. The method of claim 12, further comprising detecting the trigger event using a plurality of sensors, the sensors comprising one or more of an inertial measurement unit (IMU), a global positioning system (GPS), a barometric pressure sensor, a temperature sensor, an altitude sensor, an airspeed sensor, or a combination thereof.

21. The method of claim 12, further comprising blocking the received EMC motor control signals from reaching the at least one ESC in response to the trigger event.

22. The method of claim 12, wherein the predetermined data protocol is one of a) universal asynchronous receiver/transmitter (UART), b) three-wire pulse-width modulation (PWM), or c) Inter-Integrated Circuit (I2C).

23. An unmanned aerial vehicle (UAV) comprising:
at least one electronic speed controller (ESC) on the UAV and configured to use a predetermined data protocol;
an existing motor controller (EMC) on the UAV and configured to transmit EMC motor control signals in accordance with the predetermined data protocol to the at least one ESC to control operation of one or more motors on the UAV; and
a safety motor controller (SMC) coupled between the at least one ESC and the EMC, the SMC configured to:
receive the EMC motor control signals from the EMC;
detect a trigger event; and
transmit SMC motor control signals corresponding to at least one of the EMC motor control signals in accordance with the predetermined data protocol to the at least one ESC in response to the trigger event.

24. An apparatus for controlling an unmanned aerial vehicle (UAV) comprising a safety motor controller (SMC) coupled between at least one electronic speed controller (ESC) configured to use a predetermined data protocol and an existing motor controller (EMC) on the UAV configured to transmit EMC motor control signals in accordance with the predetermined data protocol to the at least one ESC to control operation of one or more motors on the UAV, the system comprising:
means for receiving the EMC motor control signals from the EMC on the UAV;
means for detecting a trigger event; and
means for transmitting SMC motor control signals corresponding to at least one of the EMC motor control signals in accordance with the predetermined data protocol to the at least one ESC in response to the trigger event.

25. The safety motor controller of claim 1, wherein the EMC is further configured to receive control signals from a user device.

26. The safety motor controller of claim 1, wherein the EMC and the SMC are connected by one or more electrical traces.

* * * * *